(12) United States Patent
Navarria et al.

(10) Patent No.: US 11,396,432 B1
(45) Date of Patent: Jul. 26, 2022

(54) AUTOMATED CONTAINER SHAKING SYSTEMS

(71) Applicant: Amazon Technologies, Inc., Seattle, WA (US)

(72) Inventors: Filippo Navarria, Milan (IT); Vincenzo Acunzo, Torre Annunziata (IT); Tolga Kol, Dudelange (LU); Stefano La Rovere, Bereldange (LU); Xavier Jairo de Abreu de Abreu, Vercelli (IT)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/112,038

(22) Filed: Dec. 4, 2020

(51) Int. Cl.
  *B65G 69/04* (2006.01)
  *B65G 65/00* (2006.01)
  *B65G 65/32* (2006.01)

(52) U.S. Cl.
  CPC ....... *B65G 69/0425* (2013.01); *B65G 65/005* (2013.01); *B65G 65/32* (2013.01); *B65G 2203/0233* (2013.01); *B65G 2203/0241* (2013.01); *B65G 2203/041* (2013.01); *B65G 2203/042* (2013.01)

(58) Field of Classification Search
  CPC .................................................. B65G 69/0425
  See application file for complete search history.

(56) References Cited

U.S. PATENT DOCUMENTS 6,481,558 B1 * 11/2002 Bonora ............... H01L 21/6773
198/346.2

* cited by examiner

*Primary Examiner* — William R Harp
(74) *Attorney, Agent, or Firm* — Eversheds Sutherland (US) LLP

(57) ABSTRACT

Systems, methods, and apparatuses are disclosed for automated container shaking systems. In one embodiment, an example container shaking system may include a first support disposed at a first side of a first container slot, a second support disposed at a second side of the first container slot, and a first moveable platform disposed on the first support and the second support. The first moveable platform may be configured to slide on the first support and the second support, and the first moveable platform may be configured to receive a first container. The system may include a first actuator coupled to the first moveable platform, the first actuator configured to push and pull the first moveable platform, and an optional first sensor configured to detect an item deposited into the first container. Feedback from the first sensor may optionally be used to trigger the first actuator.

20 Claims, 11 Drawing Sheets

AUTOMATED CONTAINER SHAKING SYSTEMS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. In addition, robust handling equipment for objects, such as items, packages, containers, and so forth, may be helpful in improving fulfillment center operations, reducing risk of injury, and other benefits. Moreover, improvements in various operations of order fulfillment, such as improvements to picking technology, sorting technology, packing technology, and so forth may be desired, such that manual efforts can be redirected to different tasks.

Figure 1:
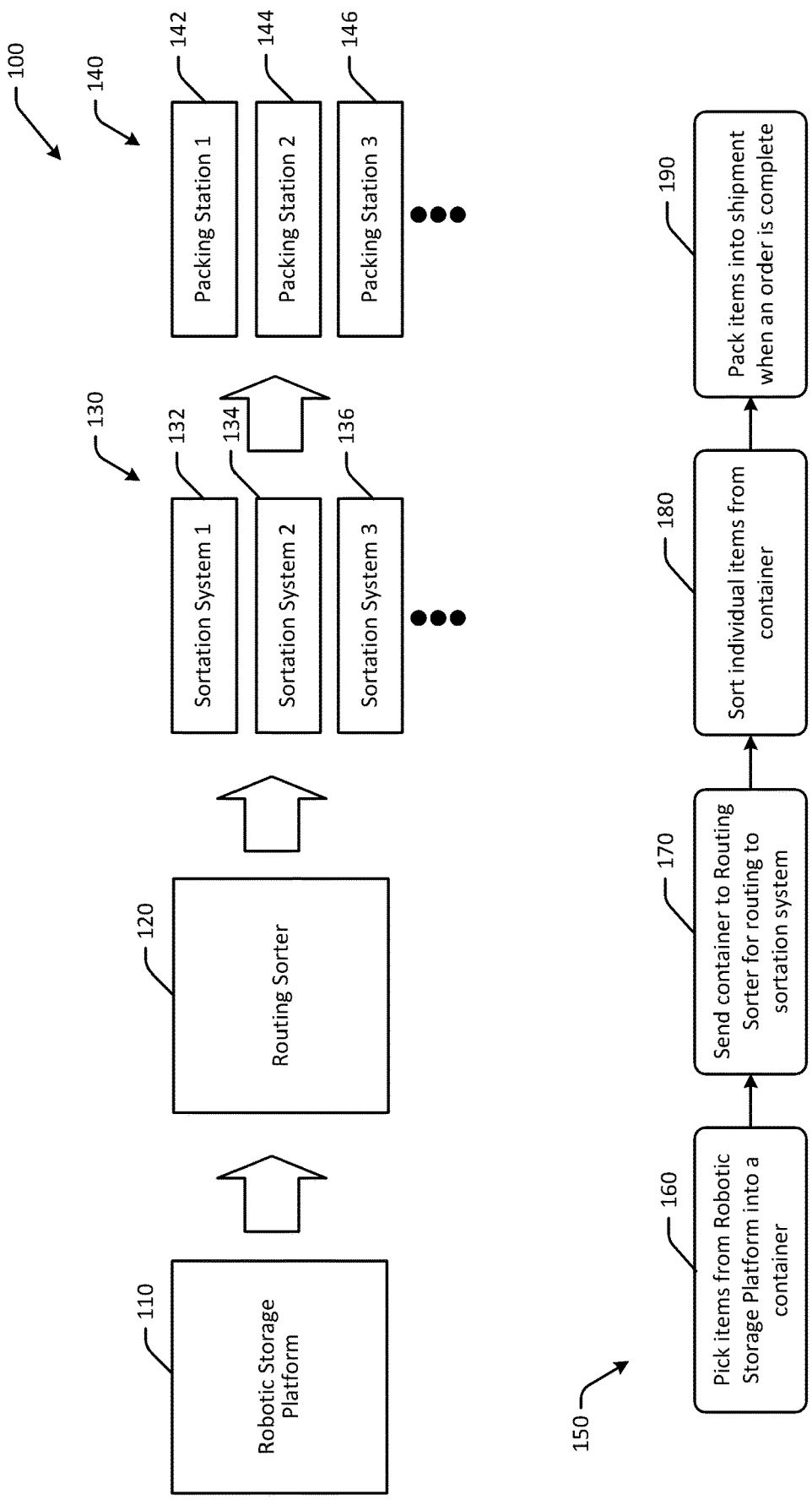
FIG. 1 is a hybrid schematic illustration of an example use case for automated container shaking systems in a fulfillment center and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted.

In addition, in instances where more than one item is sorted into a container, or in the case of single items, where a large or odd shaped item is sorted into a container, the items may pile up on one side of the container, such as the side closest to a chute or other point at which the item was dropped into the container. This may cause issues, such as items jamming or backing up on a chute leading to a container, as items build up on one side of the container. In other instances, items may protrude beyond a top of the container. For example, a long, rectangular object may protrude beyond the top of a container depending on the orientation of the object. As items are deposited into containers, redistribution of items to make the items substantially evenly distributed (e.g., substantially indicates the items are spread out about a base or floor of the container, and not necessarily indicative of any topographical distribution, etc.) may assist with subsequent handling of the container, as well as filling the container it a certain capacity and reducing a risk of jams. For example, if items are piled to one side of the container, the container may appear to be full based on feedback from a sensor, when in fact a portion of the container is empty.

Embodiments of the disclosure include automated container shaking systems that shake or otherwise move containers to help items in the container settle and/or redistribute the items in the container into a more equal distribution, thereby allowing for increased or otherwise improved filling capacity, as well as causing items that may be sub-optimally oriented to be reoriented in a more optimal arrangement (e.g., protruding items are encouraged to fall within the container, etc.). As a result, containers may not only be filled to greater capacities relative to situations where items are piled to one side of the container, subsequent handling of containers may be improved due to a more even weight distribution, reduced risk of sudden changes in center of gravity due to sudden object movements, and other benefits. For instance, handling and transport of containers, such as totes that are empty or have objects (e.g., items, packages, etc.) inside, may be difficult to perform using robotic components or other automated tools. For example, grasping a container in which an item is present may be difficult due to movement of the items (thereby causing a change to the center of gravity of the container, etc.) and/or other factors when using automated tools. Moreover, establishing control over a container in motion may be difficult when using automated tools. For example, as the container is moved, ensuring that the container and its contents (if applicable) arrive at a destination intact may be difficult when automated tools are used instead of manual effort. Although humans may be able to effectively handle and transport containers, automated tools may present challenges due to the complexity of the operations involved during retrieval, transport, and/or delivery of a container.

Some embodiments include individual moveable or shaking platforms on which containers are positioned. As items are deposited into the individual containers, the platforms may be moved (e.g., pushed forward and/or pulled back in a reciprocating motion, moved laterally, bounced, etc.) a predetermined number of times or for a predetermined length of time to help redistribute items in the container. Some embodiments may include trays or platforms that are configured to support the containers in a friction fit or otherwise relatively tight fit, so as to reduce the amount of noise generated by the motion of the platform on which the container is positioned. To move the platforms, some embodiments may include pneumatic cylinders or actuators, while other embodiments may use electric motors (e.g., solenoids, servomotors, step motors, etc.), hydraulic cylinders, or other types of actuators suitable to impart motion to the platform(s). The automated container shaking systems described herein may be coupled to item sortation systems to provide a retrofit solution to existing item sortation systems. In such instances, the automated container shaking system may be configured to be coupled to an item sortation system, and may be anchored to the floor for stability. The automated container shaking system may be unanchored and rolled away to decouple from the item sortation system for maintenance and/or repairs. Some embodiments may include breakaway or spring-loaded chutes for chutes leading to containers to provide an additional safety benefit, as discussed with respect to at least FIG. 7.

Referring to FIG. 1, an example use case 100 for automated container shaking systems in a fulfillment center and an example process flow in accordance with one or more embodiments of the disclosure. Although discussed in the context of online orders, other embodiments may be directed to any suitable use case where items, such as products, packages, or other items, are picked and/or sorted, such as instances where users may pick up orders rather than receiving a shipment.

In FIG. 1, a fulfillment center may include a robotic storage platform 110, a routing sorter 120, one or more sortation systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual operators or a combination thereof may be used to pick products. The picking process at the robotic storage platform may include locating a product in an order, obtaining the product, and sending the product to the robotic storage platform 110, such as via a conveyor belt (e.g., smooth belt, cleated belt, etc.). In the illustrated embodiment, products at the robotic storage platform 110 may be placed in a container, such as a tote.

At the routing sorter 120, totes including products that have been picked may be routed to an appropriate or designated sortation system. For example, the routing sorter 120 may determine an identifier associated with the tote, and may determine the sortation system associated with the tote using the identifier. The routing sorter 120 may route or direct the tote to the appropriate sortation system.

The sortation systems 130 may include one or more sortation system machines. In FIG. 1, a first sortation system 132, a second sortation system 134, a third sortation system 136, and so forth may be included. Any number of sortation systems may be included. Some or all of the sortation systems may be associated with certain totes, certain functions, certain geographic regions, and so forth. The sortation systems may be used to consolidate or otherwise aggregate products for single or multi-item orders. For example, a first tote may include a first item of a multi-item order, and a second tote may include a second item of the multi-item order. The sortation system may therefore identify the orders associated with the respective products in a tote, and may transport the products to a container, such as a bin, associated with the order. The sortation systems 130 may be coupled to one or more automated container shaking systems configured to shake containers after items are deposited into a specific container. When the order is complete with all of the products in the associated bin, the order may be packed. Accordingly, a specific sortation system may be designated for fulfillment of a particular order. At the sortation systems 130, totes that are received via the routing sorter 120 may be emptied, and the products in the respective totes may be transported to the appropriate bins for the orders for which the products were picked.

After a single or multi-item order is complete (e.g., the sortation system has delivered all of the products in the order to the appropriate bin, etc.), the order may be packed at the packing station 140. In some embodiments, one or more packing stations may be included. In some instances, a packing station may service more than one sortation system, while in other instances, more than one packing station may service one sortation system. In the illustration of FIG. 1, a first packing station 142 may be used to pack orders from the first sortation system 132, a second packing station 144 may be used to pack orders from the second sortation system 134, a third packing station 146 may be used to pack orders from the third sortation system 136, and so forth. At the packing stations 140, the orders may be placed into boxes and sealed for subsequent shipment. The packages may then be processed for shipment to the user. In other instances, the sortation systems 130 may be used to sort packages designated for different geographic regions, and may therefore output packages to different loading docks, etc. The sortation systems 130 may be used for additional sortation purposes.

At the fulfillment center, an example process flow 150 illustrated in FIG. 1 may be implemented to improve the efficiency and/or throughput of the fulfillment center. At a first block 160, items may be picked from the robotic storage platform 110 into a container, such as a tote. At a second block 170, the tote may be sent to the routing sorter 120 for routing to a sortation system. At a third block 180, the items from the tote may be sorted from the container by the sortation system. At a fourth block 190, the items may be packed into a shipment when all of the items in the order are sorted or when an order is complete.

Figure 2:
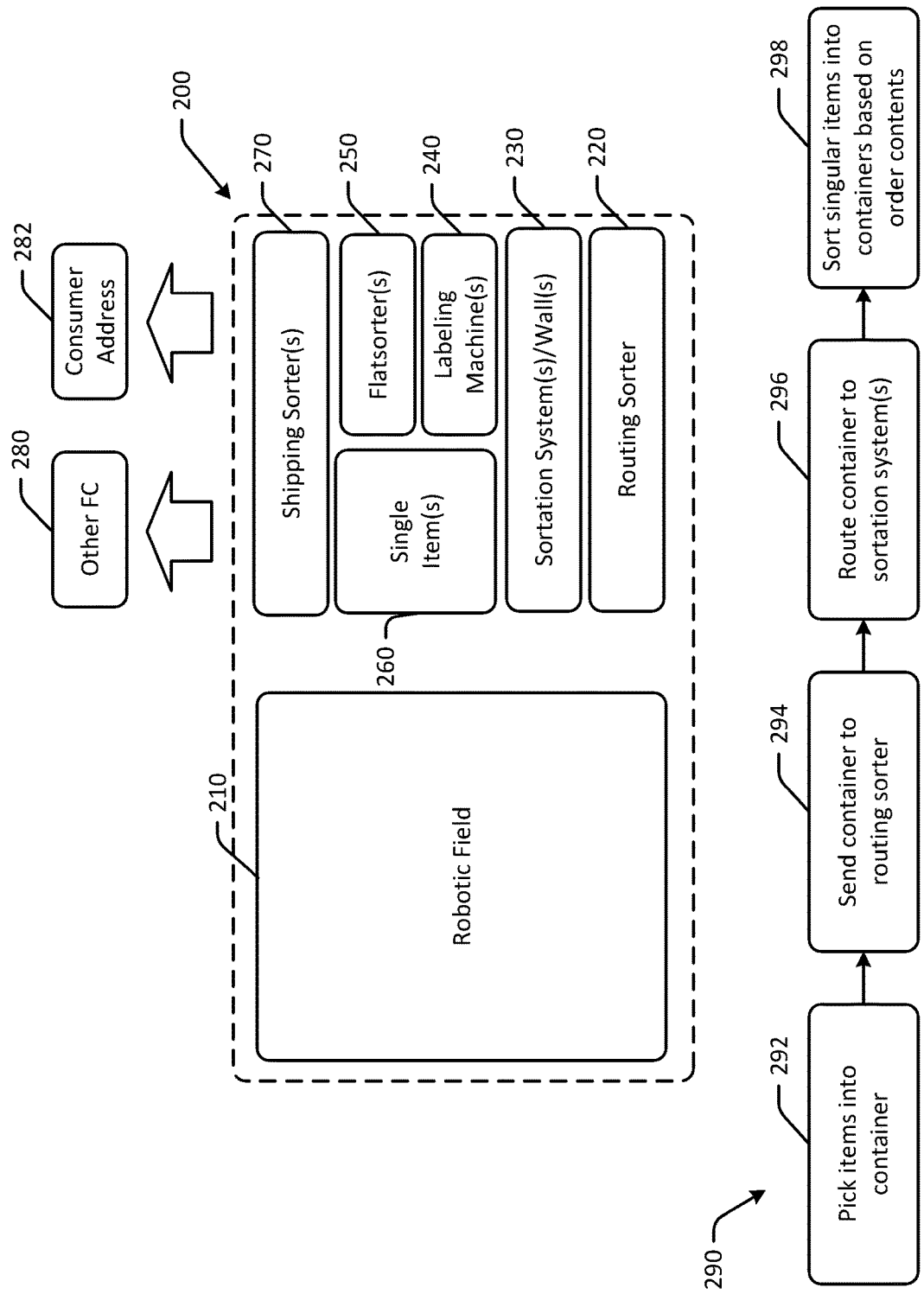
FIG. 2 is a hybrid schematic illustration of an example use case for automated container shaking systems in a fulfillment center and an example process flow in accordance with one or more embodiments of the disclosure.

FIG. 2 is a hybrid schematic illustration of an example use case for automated container shaking systems in a fulfillment center and an example process flow in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to route containers or other items to certain sortation systems, one or more sortation systems or walls 230 that may be used to sort single or multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

The fulfillment center 200 may implement a process flow 290 for processing single or multi-item orders. At a first block 292, items for different orders may be picked into a tote or container that may be sent to a sorting machine, such as one of the sortation systems 230. The tote may include items from any order that is being consolidated by the specific sortation system machine. The sortation system may sort singular items into single or multi-item orders. At a second block 294, the tote may be sent to a routing sorter. At a third block 296, the routing sorter may route or divert the tote to any sortation or an assigned sortation system (e.g., the sortation system that is consolidating items for a particular order for multi-order instances, etc.). At a fourth block 298, the sortation system may sort singular items from the tote or container into a different tote or container based on the order contents. For example, the containers at the sortation system may be assigned to a particular order that may be single or multi-item. At an optional fifth block, the containers may be moved or shaken after items are deposited. Orders may be packed after all items in the order are sorted.

The sortation system machines 220 may include bins or containers of different sizes (e.g., small, medium, large, etc.) and may be configured, in one example, to handle items that weigh up to twenty or more pounds. The totes (or other containers) may be stored at angles, such as inclined angles, that may help avoid buildup of items on a particular side of the tote. In some embodiments, the sortation system machines 220 may include multiple chutes, and may be configured to sort items at a rate of about 3,600 units per hour. In some instances, the sortation system machines 220 may have two inductors (e.g., one on each side, etc.) for inducting items from containers, and may be modular.

In some embodiments, the sortation system machines 220 may replace other processes, such as manual processes. For example, manual induction of products from a tote to a sorter machine may be a bottleneck that is avoided by the systems and methods described herein. The sortation system 230 may include cross-belt shuttles that sort singulated products into containers or totes. Sortation systems 230 may be capable of sorting at a rate of 3,500 units per hour. Certain sortation system machines 230 may be configured to handle items of up to twenty pounds, or more in some instances (e.g., 100 pounds or more), with dimensions of about 18"×14"×8" or 28"×14"×9", which may cover almost all products at the fulfillment center 200. The sortation system 230 may operate as a high-speed, high-destination sort solution that intakes items or packages and sorts them into containers using a shuttle that travels vertically and horizontally inside the machine (or outside in some instances).

Individual sortation systems may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of bins (e.g. induct individual items from a bin that has multiple items, and place the inducted items into the appropriate bin, where bins are associated with single or multi-item orders. The tote from which items are inducted may be associated with the individual sortation system machine (e.g., the modular sorting machines that form the individual sortation system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 282, and so forth.

Accordingly, in some embodiments, sortation systems may be arranged in rows and may receive totes from a routing sorter, thereby streamlining fulfillment center operation and reducing labor and space costs. The sortation systems may process totes for multi-order sortation and consolidation. As a result, there may no longer be a need to singulate and send items to a wall for manual extraction, because each tote may be assigned to a particular sortation system machine. Induct stations can be replaced with sortation system machines.

In another embodiment, pickers may pick items directly to a segmented belt conveyor at a station that is near a sortation system machine. Other nearby pick stations may also pick items directly to conveyance for the same sortation system machine. Picked items being transported to a single sortation system machine may merge together to be inducted into their unique sortation system machine, where multi-item orders may be consolidated and sent to packing.

Embodiments of the disclosure include automated container shaking systems. Certain embodiments may improve processing speed and/or throughput of fulfillment centers. Certain embodiments may improve performance of mechanical equipment for sortation and/or consolidation of items for single or multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
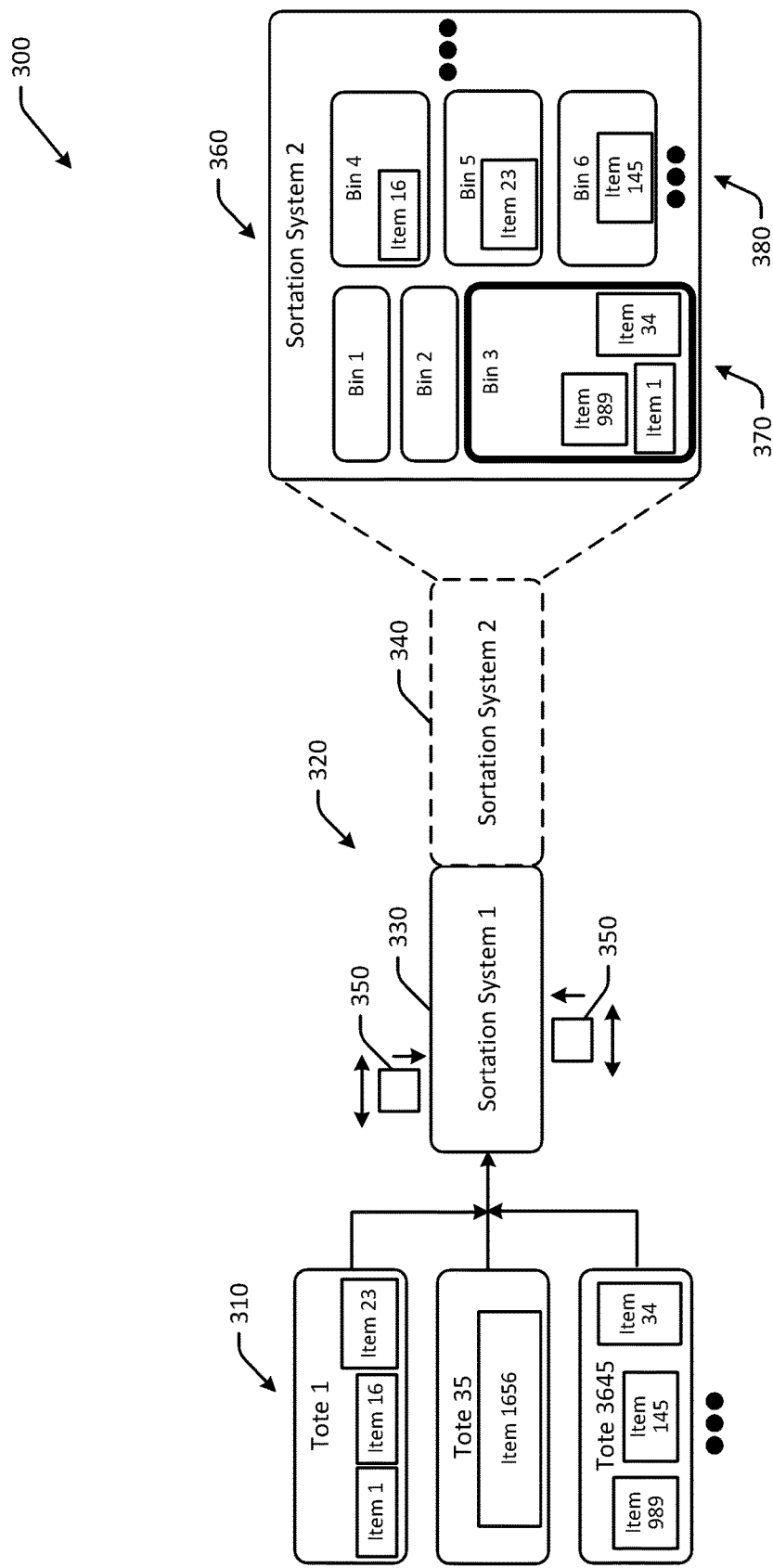
FIG. 3 is a schematic illustration of an item sorting system that may be coupled to an automated container shaking system in accordance with one or more embodiments of the disclosure.

FIG. 3 is a schematic illustration of an item sorting system that may be coupled to an automated container shaking system in accordance with one or more embodiments of the disclosure. Other embodiments may include additional or fewer components. The illustration of FIG. 3 is not to scale, and may not be illustrated to scale with respect to other figures. The sortation system illustrated in FIG. 3 may be the same sortation system discussed with respect to FIGS. 1-2.

In FIG. 3, an example use case 300 including a set of totes 310 and item sorting system(s), or sortation system(s) 320, is depicted. The set of totes 310 may include one or more totes that may optionally be assigned to, or otherwise associated with, the sortation system 320. For example, Tote 1, Tote 35, Tote 3645, and so forth may be associated with the sortation system 320. The totes may have identifiers, such as alphanumeric or other identifiers. The totes may be used to place items that have been picked into the totes. The items that are placed in the totes may be associated with orders that are to be consolidated by the sortation system 320. For example, Tote 1 may include item 1, item 16, and item 23, Tote 35 may include item 1656, Tote 3645 may include item 989, item 145, and item 34, and so forth. The item sorting system, or the sortation system 320, may be configured to receive items from a tote that includes one or more, such as multiple items, and the tote may be routed to the item sorting system or the sortation system 320.

The totes 310 may be directed to the sortation system 320 for sorting and consolidation. For example, items in the totes 310 may be inducted into the sortation system 320 via a conveyor belt.

The sortation system 320 may include one or more modules, and may be adjusted in size by adding or removing modules or standalone sortation systems as needed. For example, the sortation system 320 may include a first sortation system 330 and a second sortation system 340. The second sortation system 340 may be coupled to the first sortation system 330, or may be a standalone sortation system.

The respective sortation systems 330, 340 may be coupled to an automated container shaking system that includes one or more bins, or containers that hold items of a single or multi-item order, where the containers are disposed on moveable platforms. For example, as illustrated in side view 360, the automated container shaking system that is coupled to the item sortation system 340 may include a first chute 370, or vertical stacking, of bins, and a second chute 380 of bins. The bins in the respective chutes may be of different sizes or dimensions, or may be placed in different vertical locations along the chute. The containers may be stored at angled positions. The automated container shaking system may include a plurality of bins disposed in an array along one or more sides of the first modular item sorting machine 330 and the second modular item sorting machine 340. The respective bins may be configured to be repositioned within different chutes and/or at different vertical locations. In FIG. 3, Bin 1 and Bin 2 may have the same height, while Bin 3 in the same column or chute may have a different height. Any suitable number of bins may be included in a chute and/or array.

Items or products inducted from the totes 310 may be sorted and directed to a bin associated with the order for which the item was picked. The items may be transported by one or more shuttles or mobile carrier units 350, which may move in one or more directions within the sortation system 320. In some embodiments, the shuttles or mobile carrier units 350 may be positioned outside of the sortation system 320. In some embodiments, the sortation system(s) 320 may include one or more mobile carrier units 350 or other shuttles that can be used to move items, such as products, packages, containers, and so forth. Mobile carrier units 350 may include one or more RFIDs that can be used to retain traceability of an item to a carrier, such that the entire system may not have to be purged in case of a complete power loss. The lineage or traceability can be established by associating a barcode or other identifier of the item with the carrier RFID tag at the point of induction or elsewhere.

For example, Item 1 may be inducted from Tote 1 and placed in Bin 3, along with Item 989 and Item 34 from Tote 3645. Bin 3 may be associated with an order that included those three items, and may therefore be ready for packing. Similarly, Item 16 may be routed to Bin 4, Item 23 may be routed to Bin 5, Item 145 may be routed to Bin 6, and so forth. Any number of bins, totes, and/or modules may be included.

Figure 4:
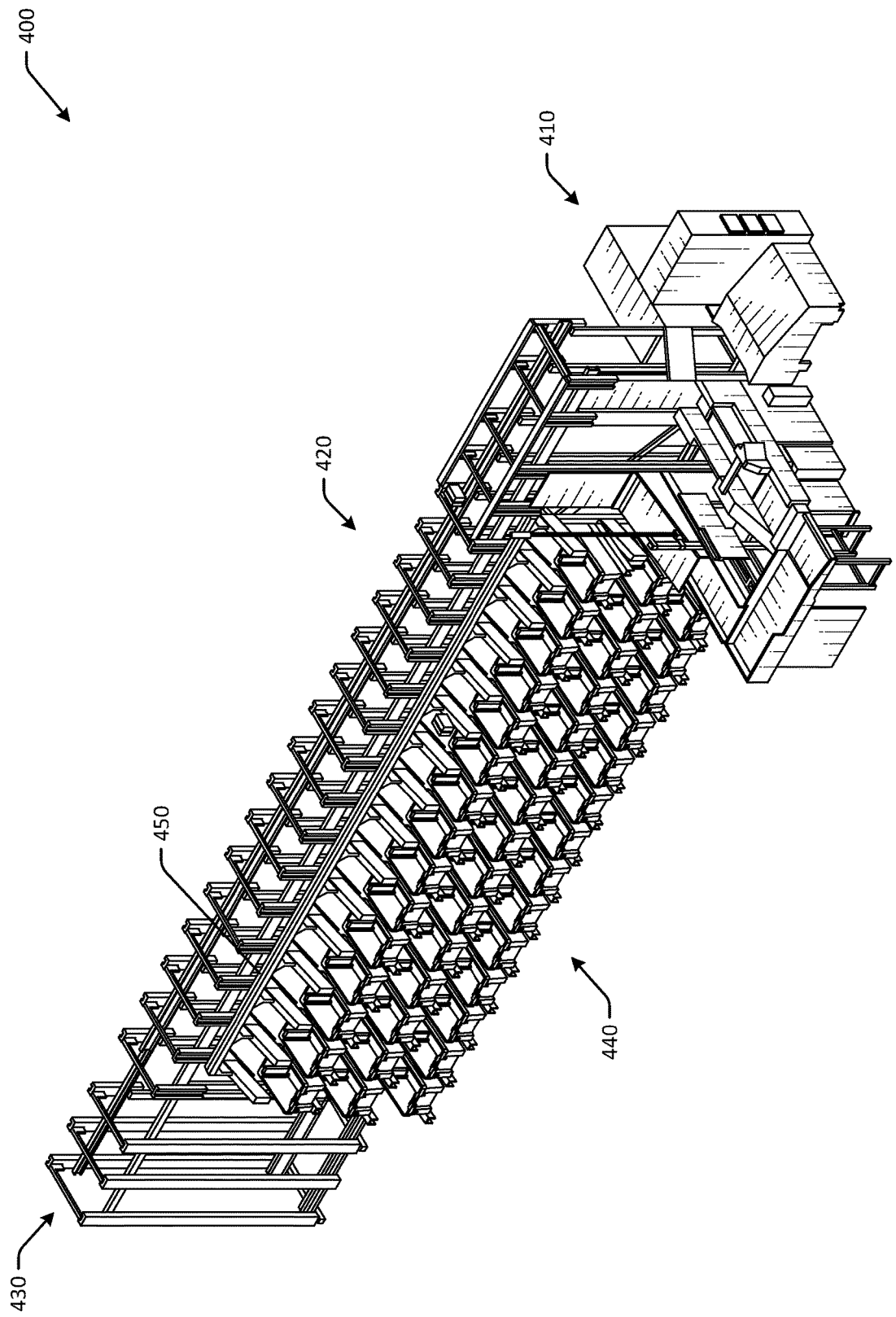
FIG. 4 is a schematic illustration of an item sorting system coupled to an automated container shaking system in accordance with one or more embodiments of the disclosure.

FIG. 4 is a schematic illustration of an item sorting system 400 coupled to an automated container shaking system 440 in accordance with one or more embodiments of the disclosure. Other embodiments may include additional or fewer components. The illustration of FIG. 4 may not be to scale, and may not be illustrated to scale with respect to other figures. The item sorting system and automated container shaking system illustrated in FIG. 4 may be the same sortation system discussed with respect to FIGS. 1-3.

In FIG. 4, the item sorting system 400 may be configured to sort one or more items into different chutes or containers. The item sorting system 400 may include one or more shuttles that may transport items from an induction portion 410 through an aisle 420 formed by a frame 430 of the item sorting system 400. Items to be sorted may be inducted to the item sorting system 400 at the induction portion 410. The items may be loaded individually onto a shuttle, and the shuttle may transport the item through the aisle 420 until a destination is reached. The destination may be a certain chute, a certain container, or another destination. The shuttle may load and/or unload the item using an on-board conveyor. For example, the shuttle may unload the item onto a certain chute, and the chute may lead to a particular container.

The mobile carrier units or shuttles may individually include one or more conveyor belts, such as cross-belt conveyors or other mechanical components, and may be configured to move along the respective tracks of the item sorting system 400. The shuttles may be configured to perform various functions, such as retrieving items, depositing items into containers on the different levels of the container matrix, retrieving full containers from container slots, depositing empty containers into container slots, and other functions. The shuttles may be controlled by one or more computer systems or controllers. The shuttles may include at least two sidewalls on opposite sides of the shuttle. The sidewalls may be used to secure a payload. Some embodiments may not include sidewalls. Some embodiments may include one or more doors that can be opened or closed. For example, the shuttle may include a first door disposed transverse to the at least two sidewalls, where the shuttle is configured to automatically open and/or close the first door. In some instances, the first door, when in an open position, may form a chute that can be angled towards a container on a lower level. In some instances, the shuttle may include a second door disposed opposite the first door, where the shuttle is configured to automatically open and/or close the second door. Shuttles that include multiple sidewalls and/or doors that serve as sidewalls may be used to secure various types of payloads, such as round balls or objects that may remain contained within the sidewalls during movement.

The automated container shaking system 440 may be coupled to the item sorting system 400. Specifically, a frame 450 of the automated container shaking system 440 may be coupled to the frame 430 of the item sorting system 400. In some embodiments, chutes may be coupled to the frame 450 of the automated container shaking system 440, while in other embodiments, the chutes may be coupled to the frame 430 of the item sorting system 400.

As depicted in FIG. 4, the automated container shaking system 440 may include an array or matrix of containers. The container matrix may be a modular rack system that includes one or more vertically spaced or horizontally spaced levels, where some or all of the levels may include container slots. The container matrix may house containers, such as totes, bins, bags, or other containers, that can be used to hold sorted items, such as items that correspond to certain orders. The containers may be stored at one or more different angles. The container matrix may include an array of containers with removable and/or rearrange-able container configurations. The containers may be of the same or different dimensions. The container matrix may include one or more levels, such as a first level and a second level. The first level may include a first plurality of container slots configured to receive individual containers, and the second level may include a second plurality of container slots configured to receive individual containers. The first level may be an upper level or lower level with respect to the second level.

Some or all of the containers may be disposed on individual moveable platforms or trays. The respective platforms may be configured to impart motion (e.g., to "shake" or otherwise move, etc.) to the containers, and, in turn, to items inside the containers. Accordingly, the automated container shaking system 440 may include one movable platform for some or all of the containers supported by the automated container shaking system 440. In some embodiments, individual moveable platforms may be actuated individually, whereas in other embodiments, more than one moveable platform may be actuated at the same time, such as some or all of the moveable platforms in a column or row.

The automated container shaking system 440 may be a container shaking system for use with the item sorting machine 400. The automated container shaking system 440 may include the frame 450 that forms a container slot array or matrix. The frame 450 may include a first container slot in a first row and a second container slot in a second row, where individual container slots are configured to support individual containers. A first container may be disposed in the first container slot, where the first container is configured to receive items from the item sortation machine 400. The automated container shaking system 440 may include a first support disposed at a first side of the first container slot, where the first support is not in direct contact with the first container. For example, a guide component or other component may separate the first support from a moveable platform. The automated container shaking system 440 may include a second support disposed at a second side of the first container slot, where the second support is not in direct contact with the first container.

The automated container shaking system 440 may include a first moveable platform, such as a first reciprocating tray, that is disposed on the first support and the second support, the first reciprocating tray may be configured to slide on the first support and the second support. The first reciprocating tray may include a first flared end at a first side and a second flared end at a second side, where the first container is disposed on the first reciprocating tray. The first flared end and the second flared end may make it easier to guide containers onto and off of the first reciprocating tray, and may allow for increased locational tolerance (and therefore reduced accuracy) when loading containers onto moveable platforms or trays.

The automated container shaking system 440 may include a first pneumatic cylinder coupled to the first reciprocating tray, the first pneumatic cylinder configured to push the first reciprocating tray from a first position to a second position, and to pull the first reciprocating tray from the second position to the first position. The first position may be a default position and the second position may be an extended position. In other embodiments, a different type of actuator may be used instead of a pneumatic cylinder. The automated container shaking system 440 may include a first sensor configured to detect an item deposited into the first container. The first sensor may be configured to trigger the first pneumatic cylinder to push and pull the first reciprocating tray a predetermined number of times. For example, the tray may be actuated once, twice, three times, or another number of times, and/or for a certain length of time. The impact force and the time between actuation may be varied as well depending on how full the container is.

The automated container shaking system 440 may include a second container disposed in the second container slot, a third support disposed at a first side of the second container slot, a fourth support disposed at a second side of the second container slot, and a second reciprocating tray disposed on the third support and the fourth support, the second reciprocating tray configured to slide on the third support and the fourth support. The second container may be disposed on the second reciprocating tray. The automated container shaking system 440 may include a second pneumatic cylinder coupled to the second reciprocating tray, and a second sensor configured to detect an item deposited into the second container. The second sensor may be configured to trigger the second pneumatic cylinder to push and pull the second reciprocating tray a predetermined number of times.

The automated container shaking system 440 may include a controller configured to determine, using the first sensor, that the item has been deposited into the first container, and to cause actuation of the first reciprocating tray. The controller may be optionally configured to determine, using a camera, that items in the first container are substantially evenly distributed in the first container. For example, a camera may be disposed adjacent to the automated container shaking system 440, and may be a separate system and/or coupled to the item sorting system 400, and may be configured to image at least a portion of the interior of the first container. Based at least in part on processing of image data generated by the camera, the controller may determine whether items are substantially evenly distributed. For example, an amount of uncovered floor space in the container may be indicative of whether the items are evenly distributed.

Figure 5:
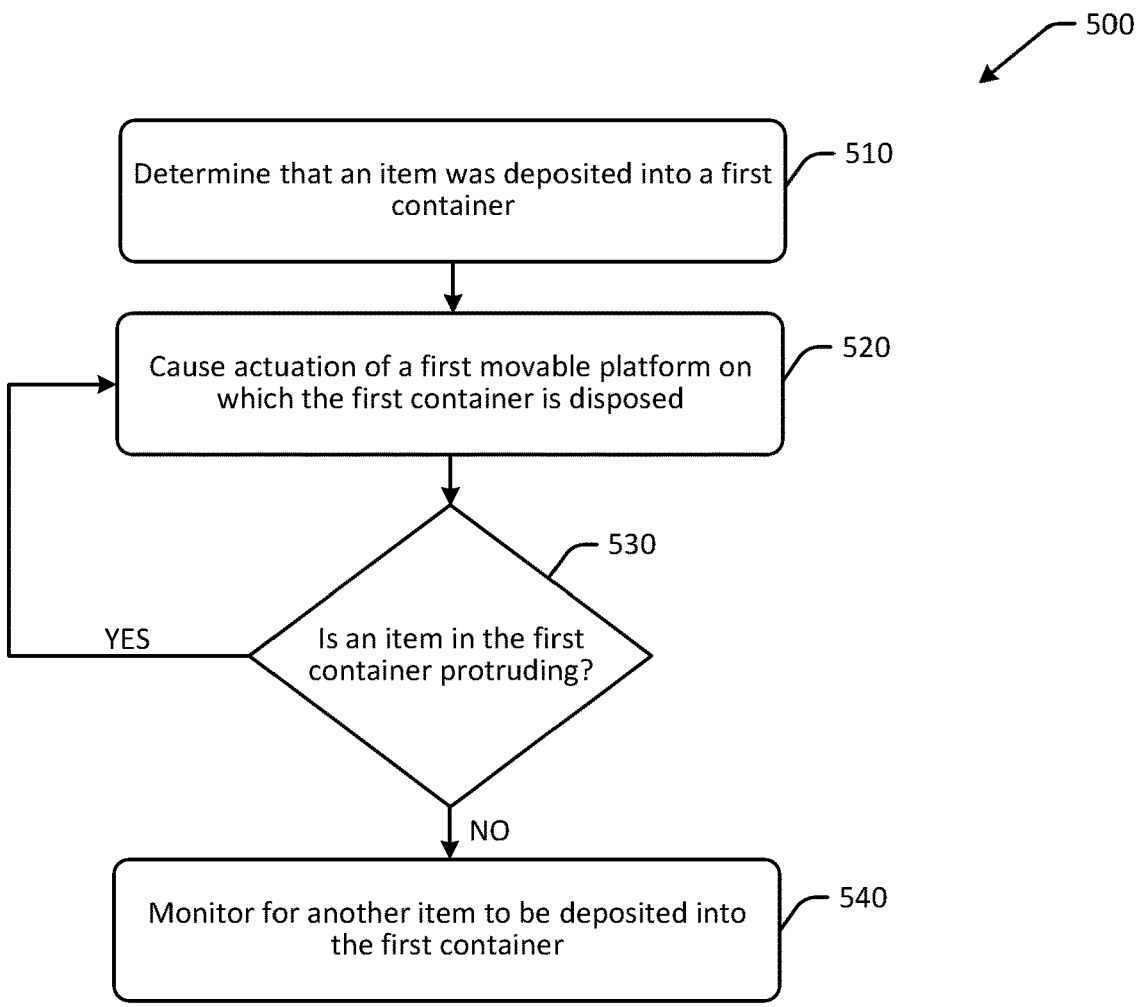
FIG. 5 is a schematic illustration of an example process flow for automated container shaking in accordance with one or more embodiments of the disclosure.

FIG. 5 is a schematic illustration of an example process flow 500 for automated container shaking in accordance with one or more embodiments of the disclosure. One or more of the blocks illustrated in FIG. 5 may be performed in a different order or across a distributed environment. In some embodiments, the operations of process flow 500 may be performed by a controller or computer system in communication with one or more automated container shaking systems.

At block 510, it may be determined that an item was deposited into a first container. For example, a computer system or controller having one or more computer processors coupled to memory and configured to execute computer-executable instructions may be configured to determine that an item was deposited into a first container. To determine that the item was deposited into the first container, some embodiments may include a first sensor. The first sensor may be disposed adjacent to a chute and/or the first container, and may be a photocell, a light sensor, or a different type of sensor configured to detect an item passing by the sensor on the chute and/or being deposited into the container. The controller may receive sensor feedback from the first sensor, such as light interruption data, and may determine that an item was deposited into the first container. In other embodiments, the first sensor may not be included. Instead, data from the sortation system regarding the containers to which items are destined may be used to infer or otherwise determine that the item was deposited into the first container. For example, if an item inducted into the item sortation machine is determined to be deposited into the first container, the controller may determine that after a certain length of time has elapsed since the item was inducted, the item may be assumed to have been delivered to the first container. The length of time may be determined based at least in part on shuttle speed of the shuttles transporting items in the item sortation machine, the location of the first container relative to the induction portion of the item sortation machine, a load on the item sortation system, and/or other factors.

At block 520, a first moveable platform on which the first container is disposed may be caused to be actuated. For example, a computer system or controller having one or more computer processors coupled to memory and configured to execute computer-executable instructions may be configured to cause actuation of a first moveable platform on which the first container is disposed. The container may be supported by, and optionally secured to, the first moveable platform. The first moveable platform may be coupled to an actuator, such as an electric motor, that causes the first moveable platform to move. Electric motors may include servomotors, solenoids, step motors, electrical cylinders, or other types of electric motors. Other embodiments may use different types of actuators, such as a pneumatic actuator, that causes the first moveable platform to move. Pneumatic actuators may include pneumatic cylinders, elastic pneumatic chamber devices, and other pneumatic actuators. In some embodiments, the actuator may cause the first moveable platform to move back and forth in a linear direction, whereas in other embodiments, motion may be at least partially in a lateral direction. In some embodiments, the first moveable platform may be constrained from lateral movement by one or more guiderails. The controller may cause the actuator to move the first moveable platform. Actuation may result in movement of the first moveable platform one or more times.

At determination block 530, a determination may be made as to whether an item in the first container is protruding. For example, using data from the first sensor or from a second sensor, the controller may determine whether an item is protruding beyond a top of the container. For example, a second sensor may be a photocell or light sensor aligned with a top of the container, and configured to detect an item protruding past the top of the container. If it is determined at determination block 530 that there is no item in the first container that is protruding, the process flow 500 may proceed to block 540, at which the controller may monitor for another item to be deposited into the first container.

If it is determined at determination block 530 that there is an item in the first container that is protruding, the process flow 500 may return to block 520, at which the controller may again cause actuation of the first moveable platform on which the first container is disposed. The controller may continue to cause actuation of the first moveable platform until there are no items protruding.

In some embodiments, the time between actuation of the first moveable platform may vary depending on how full the container is. For example, the less full the container, the more time may be allowed between actuation. The more full the container, the less time between actuation events, such that additional vibration may be induced in the items in the items in the container. In addition, the force applied to the container and/or the first moveable platform may vary depending on how full the container is, with more force being applied to more full containers. In some embodiments, instead of determining whether an item is protruding, or in addition to determining whether an item is protruding, the controller may be configured to determine, using a camera, that items in the first container are substantially evenly distributed in the first container. Image data produced by the camera may be processed using computer vision to determine an amount of uncovered floor space, which may be indicative of whether the items are substantially evenly distributed, where more uncovered floor space is indicative of a less even distribution.

In some embodiments, triggering of the first actuator may cause the first actuator to push and/or pull the first moveable platform more than once, such as a plurality of times. A delay between a pull event and a subsequent push event may be modifiable in some embodiments based at least in part on dimensions of items in the first container. For example, if items are larger than a threshold, the delay may be increased to allow the items time to settle. In some embodiments, a push force or a pull force generated by the first actuator can be modifiable based at least in part on the dimensions of items in the first container (e.g., greater force for greater dimensions, etc.). Similarly, in some embodiments, a delay between a pull event and a subsequent push event can be modifiable based at least in part on a fullness level of the first container (e.g., greater delay for increased levels of fullness, etc.), and/or a push force or a pull force generated by the first actuator can be modifiable based at least in part on the fullness level of the first container (e.g., greater force for increased levels of fullness, etc.).

Figure 6:
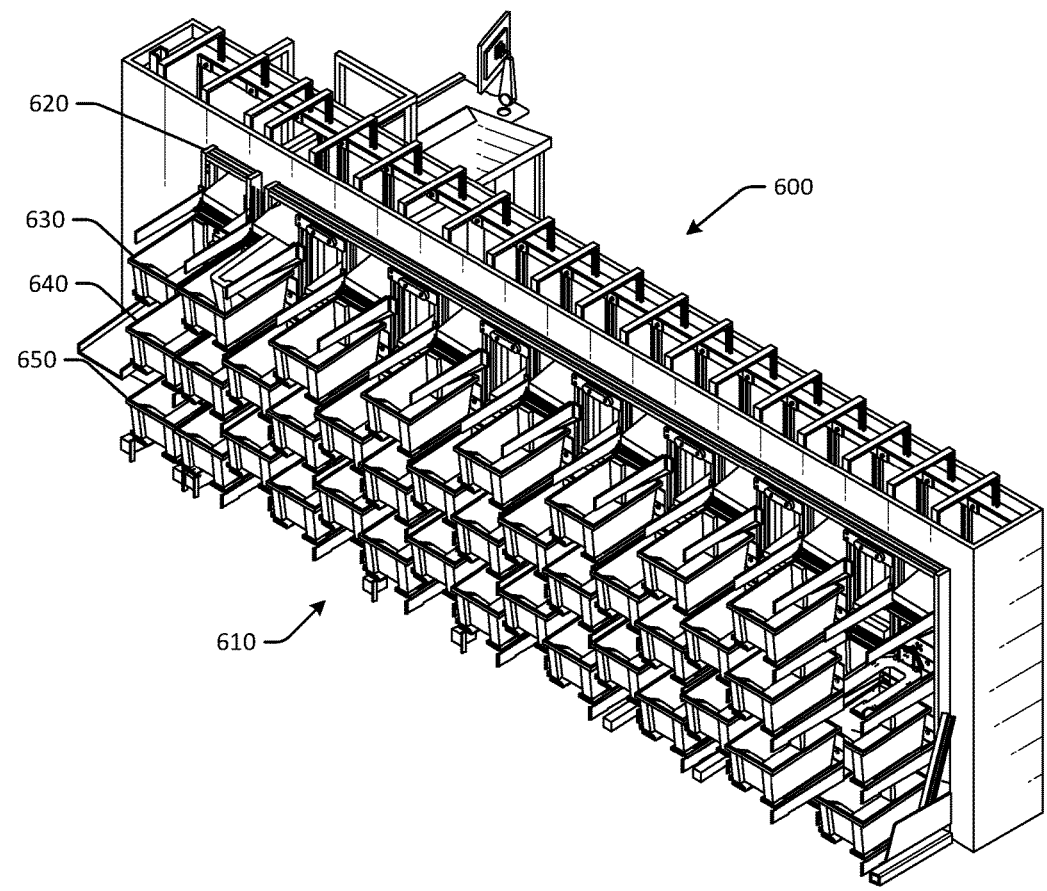
FIG. 6 is a schematic illustration of an item sorting system coupled to an automated container shaking system in perspective and front views in accordance with one or more embodiments of the disclosure.
Figure 6:
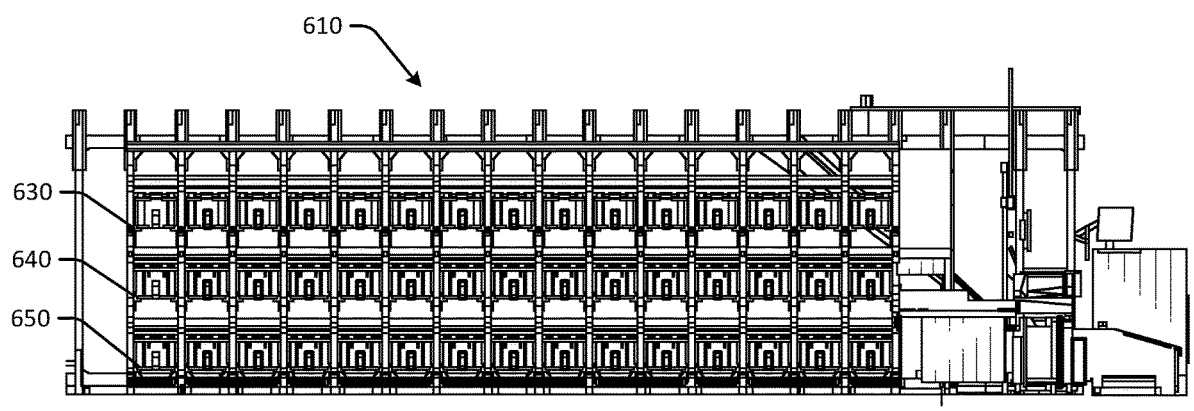

FIG. 6 is a schematic illustration of an item sorting system 600 coupled to an automated container shaking system 610 in perspective and front views in accordance with one or more embodiments of the disclosure. Other embodiments may include additional or fewer components. The illustration of FIG. 6 may not be to scale, and may not be illustrated to scale with respect to other figures. The item sorting system and automated container shaking system illustrated in FIG. 6 may be the same item sorting system and automated container shaking system discussed with respect to FIGS. 1-5

The automated container shaking system 610 may include a frame 620 that is coupled to a frame of the item sorting system 600. The automated container shaking system 610 may include a number of container slots in which one or more containers can be disposed. The container slots may be arranged in an array, a matrix, or any number of rows or columns. For example, the container slots in the example of FIG. 6 may include a first row with a first container, a second row with a second container 640, and a third row with a third container 650. The first container 630 may be disposed on a first moveable platform. The second container 640 may be disposed on a second moveable platform. The third container 650 may be disposed on a third moveable platform. The respective moveable platforms may at least partially define individual container slots.

The automated container shaking system 610 may include a first support disposed at a first side of a first container slot, such as a first container slot in which the first container 630 is disposed. The automated container shaking system 610 may include a second support disposed at a second side of the first container slot. The automated container shaking system 610 may include a first moveable platform disposed on the first support and the second support, where the first moveable platform is configured to slide on the first support and the second support, and where the first moveable platform is configured to receive a first container. For example, the container may be positioned on top of the first moveable platform. The automated container shaking system 610 may include a first actuator, such as a pneumatic cylinder, coupled to the first moveable platform, and the first actuator may be configured to push and/or pull the first moveable platform. For example, the first actuator may push and/or pull the first moveable platform along linear rails in a forward direction and/or a reverse direction. The automated container shaking system 610 may include a first sensor configured to detect an item deposited into the first container. Feedback from the first sensor may be used to trigger the first actuator. For example, a computer system or controller may be configured to detect, using the first sensor, an item, and may cause actuation of the first moveable platform via the first actuator.

In some embodiments, the automated container shaking system 610 may include one or more cameras. For example, the automated container shaking system 610 may include a first camera configured to image the first container 630, and the controller may be configured to determine, using image data from the first camera, that items in the first container are not substantially evenly distributed, and cause the first actuator to be triggered again. This process may be repeated until items are settled in the container (e.g., floor space in the container is covered, etc.) and/or there are no items protruding from the container.

Figure 7:
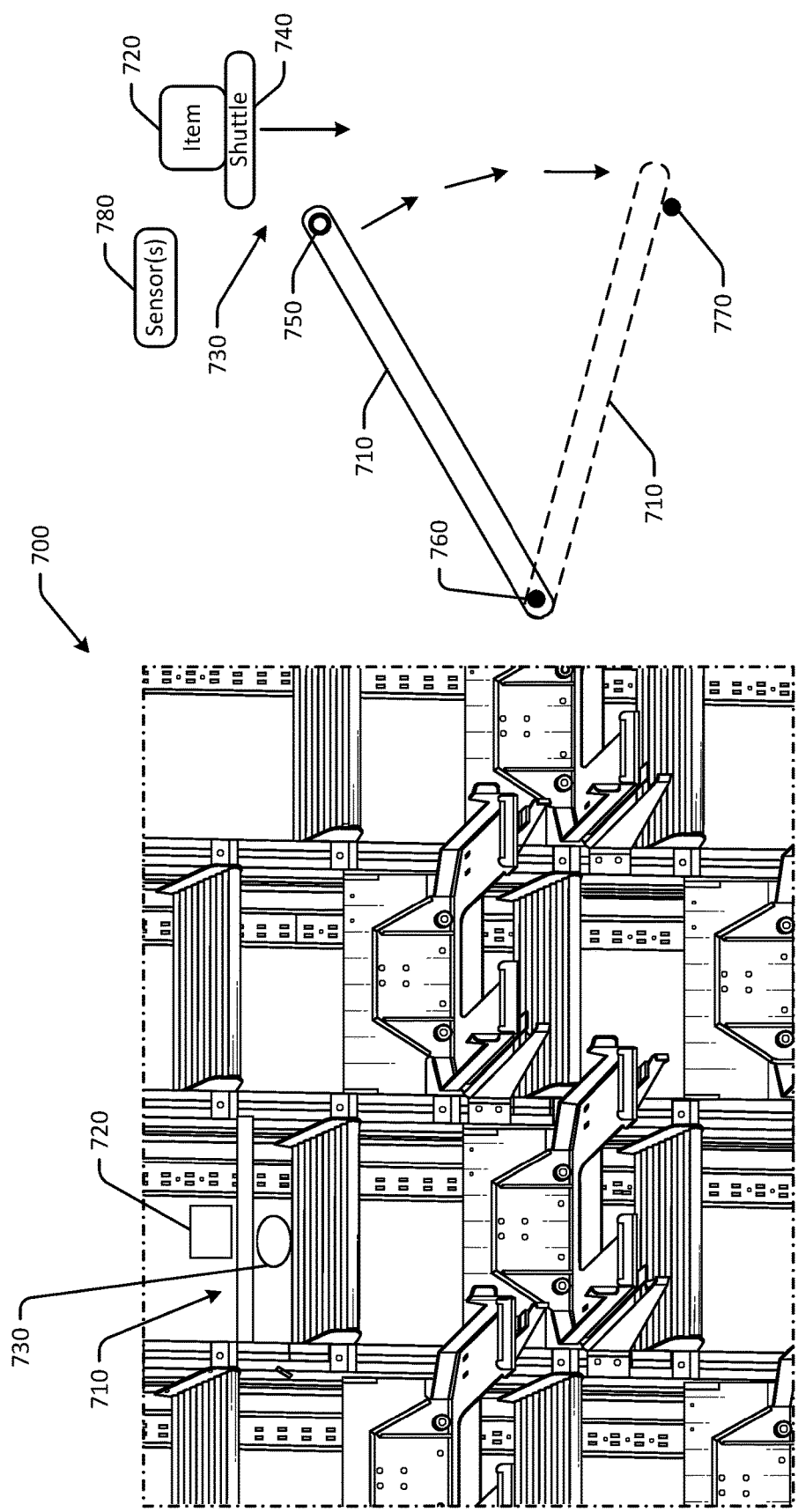
FIG. 7 is a schematic illustration of a portion of an automated container shaking system in accordance with one or more embodiments of the disclosure.

FIG. 7 is a schematic illustration of a portion of an automated container shaking system 700 in accordance with one or more embodiments of the disclosure. Other embodiments may include additional or fewer components. The illustration of FIG. 7 may not be to scale, and may not be illustrated to scale with respect to other figures. The automated container shaking system illustrated in FIG. 5 may be the same automated container shaking system discussed with respect to FIGS. 1-6.

The automated container shaking system 700 may include chutes for some or each respective container supported by the automated container shaking system 700. The chutes may be used to guide items from shuttles of an item sorting system into a container of the automated container shaking system 700. For example, the automated container shaking system 700 may include a first chute 710 that leads to a container that would be positioned on top of the moveable tray depicted in FIG. 7. A shuttle 740 of the item sorting system may transport an item 720 to the chute 710, and unload the item 720 onto the chute 710. The item 720 may move down the chute 710 and into the container. One or more sensors 780 may be disposed about the chute 710 and/or the container to detect when items are deposited into the container and/or items move down the chute 710. The chute 710 may be passive rollers, active rollers, a conveyor, a plastic surface, a composite material surface, a non-magnetic metal surface, or a different type of surface.

In some instances, there may be a gap 730 between an end of the chute 710 and the shuttle 740. In such instances, if the shuttle 740 moves vertically downwards, the gap 730 may quickly get smaller. Items may, from time to time, get jammed at the end of the chute 710 and/or in the gap 730, thereby creating a safety hazard. For example, if a jam is being cleared at the same time as the shuttle 740 is moving past the chute 710, an injury could occur. To prevent the risk of such injury, embodiments may include a breakaway chute. For example, the chute 710 may be coupled to a frame of the automated container shaking system 700 using a first pin 760 at a first end and a second pin 750 at a second end. The first pin 760 may be a normal pin and may secure the first end of the chute 710 to the frame. The second pin 750, however, may be a breakaway pin that is configured to snap or otherwise break under a certain amount of force, such as about 100-150 Newtons, such as about 140 Newtons or a force of 13 kilograms, or another force value. Therefore, if something is caught in the gap 730 and the shuttle 740 is moving downwards, rather than breaking or injuring anything in the gap 730, the breakaway pin 750 may break and the chute 710 may rotate downwards, thereby allowing whatever was stuck in the gap 730 to be safely removed without injury. As the chute 710 rotates downwards, one or more stopping supports 770 may prevent the chute 710 from damaging another chute or sensor underneath.

In other embodiments, a spring may be used instead of a breakaway pin. For example, the first chute may be coupled to the frame with a spring instead of the breakaway pin 750. The spring may be optionally coupled to the frame at a proximal end adjacent to the item sortation machine. The spring may be configured to stretch a certain length, such as about 20 centimeters under a force of 13 kilograms, so as to provide the same safety feature as the breakaway pin 750, but may bias the chute 710 back to its default position without requiring replacement of the breakaway pin. In one example, the spring may have a spring constant of between 50 Newtons/meter and 75 Newtons/meter, such as about 62 Newtons/meter.

Accordingly, the automated container shaking system 700 may include a first chute, such as the chute 710, coupled to the frame of the automated container shaking system 700 and disposed adjacent to both the first container and the sensor 780. Items from the item sortation machine may pass through or over the first chute 710 and fall into the first container. The first chute 710 may be coupled to the frame with one or more pins (e.g., the second pin 750, etc.) at a proximal end adjacent to the item sortation machine, and one or more pins (e.g., the first pin 760, etc.) at a distal end adjacent to the first container. The second pin 750 may be a breakaway pin configured to break at a force of less than about 140 Newtons. The automated container shaking system 700 may include one or more stopping supports 770 configured to prevent the first chute 710 from falling to a vertical orientation when the breakaway pin is broken.

Figure 8:
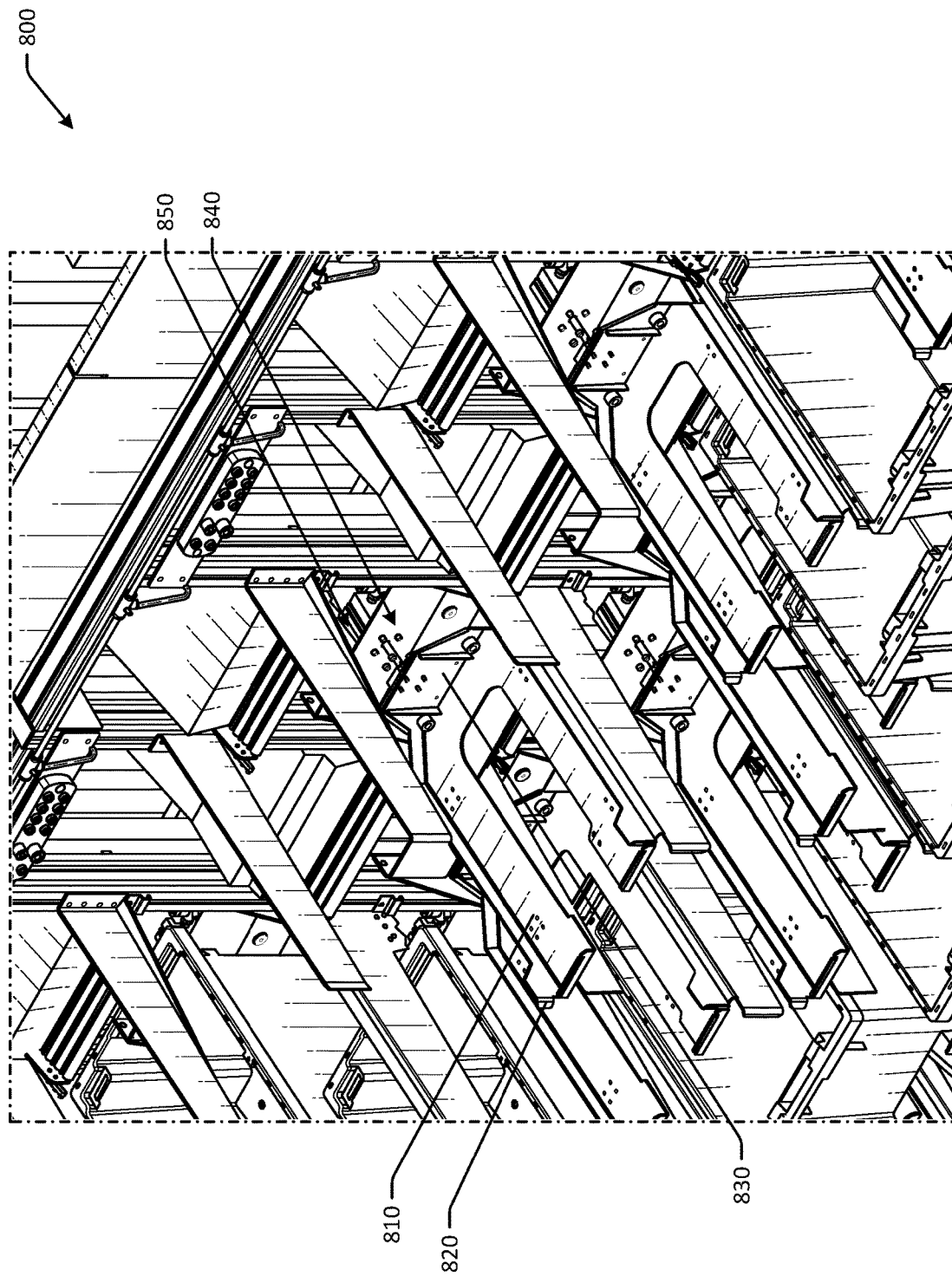
FIGS. 8-10 are schematic illustrations of various views of a moveable tray and additional components of an automated container shaking system in accordance with one or more embodiments of the disclosure.
Figure 9:
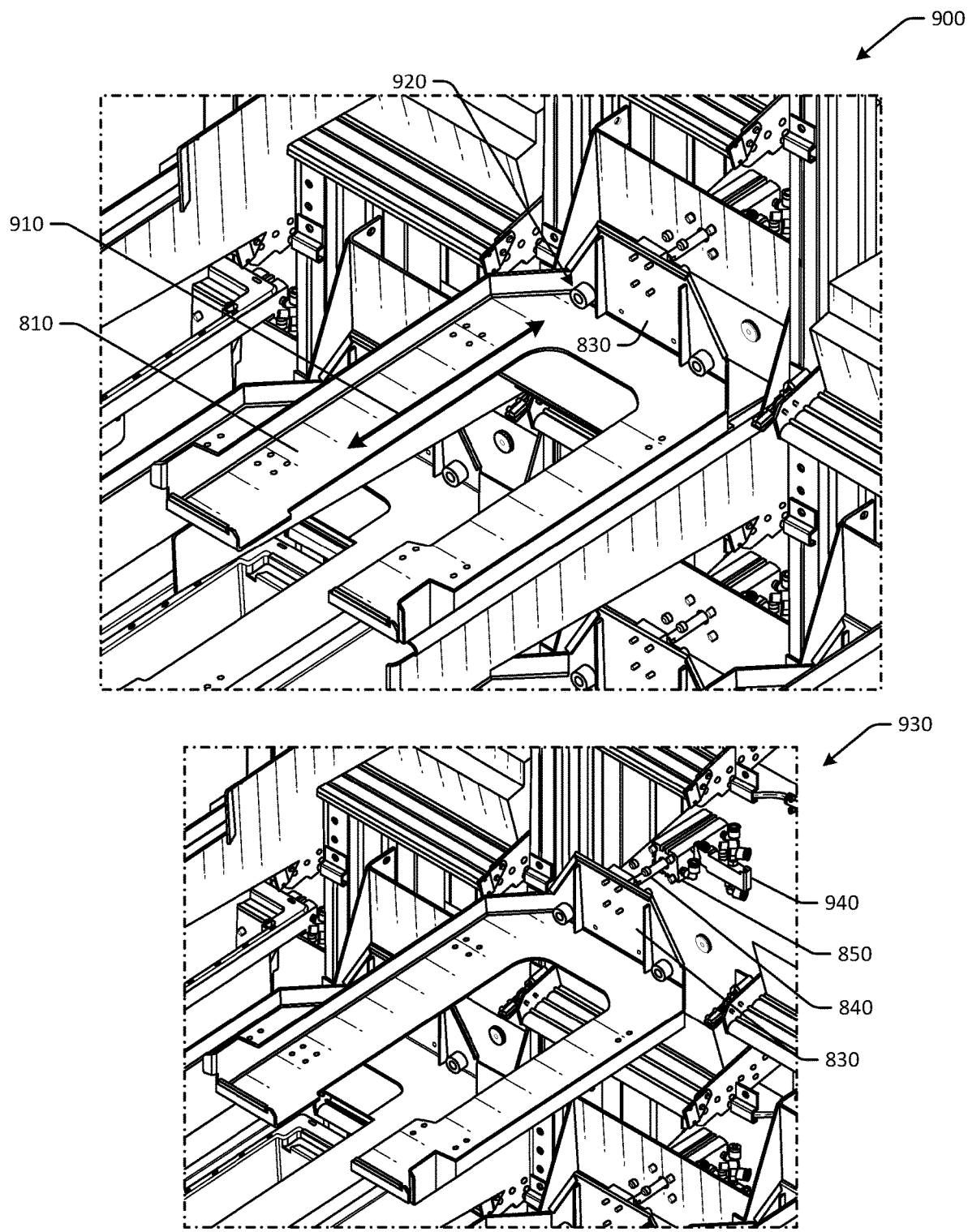
Figure 10:
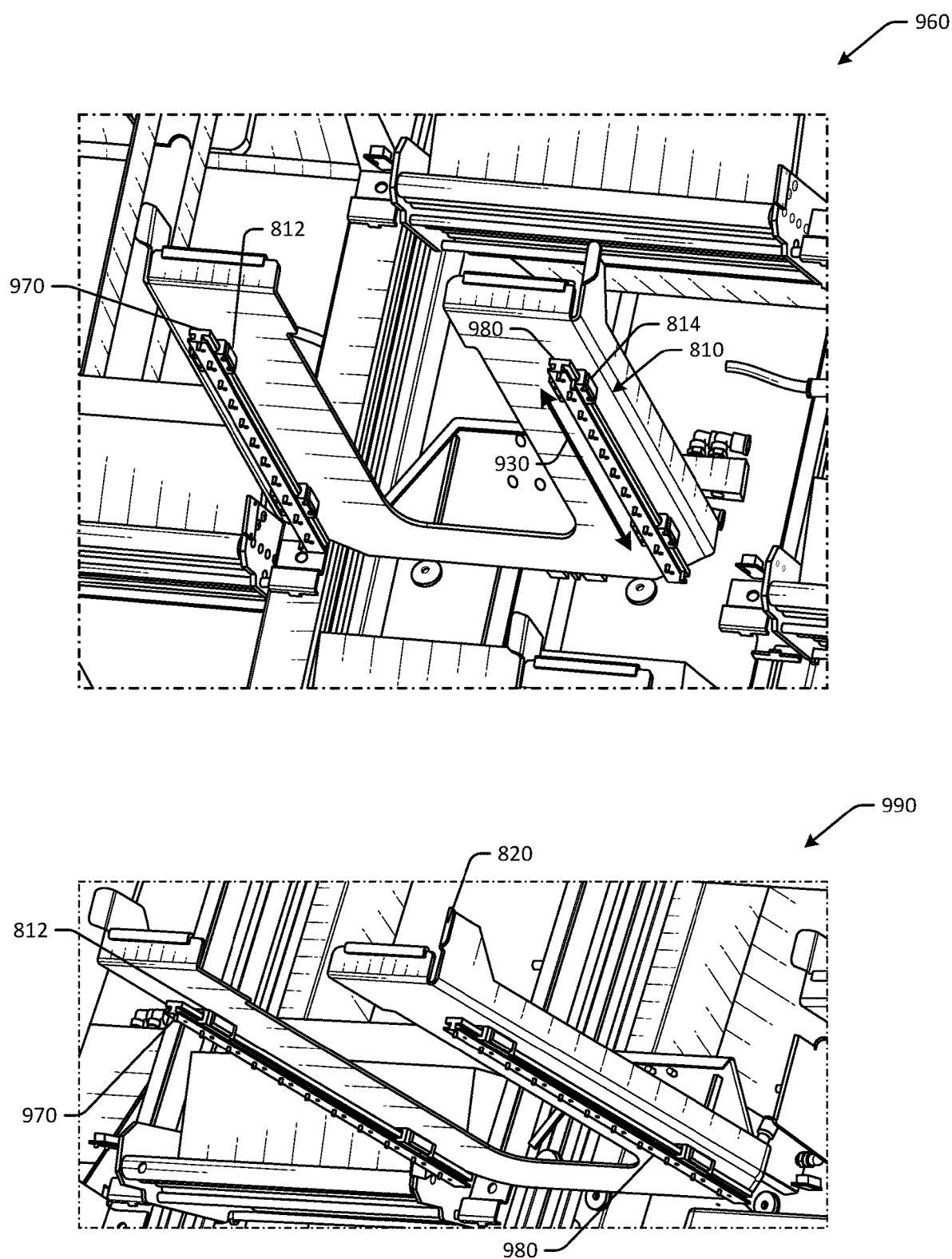

FIGS. 8-10 are schematic illustrations of various views of a moveable tray and additional components of an automated container shaking system 800 in accordance with one or more embodiments of the disclosure. Other embodiments may include additional or fewer components. The illustrations of FIGS. 8-10 may not be to scale, and may not be illustrated to scale with respect to other figures.

FIG. 8 depicts a number of moveable platforms of the automated container shaking system 800 on which containers can be positioned. A first moveable platform 810 is illustrated without a container on top. The first moveable platform 810 may include raised surfaces about a portion of a perimeter of the first moveable platform 810 to secure a container. The first moveable platform 810 may include one or more outward flared ends 820 that may be configured to guide containers onto the first moveable platform 810. This may allow for reduced accuracy requirements when placing empty containers onto the first moveable platform 810. The moveable platform may therefore include a first flared end 820 at a first side, and a second flared end 820 at a second side, where the first flared end and the second flared end guide the first container onto the first moveable platform 810. The first moveable platform 810 may support containers disposed on top of the first moveable platform 810 in a friction fit, such that the container does not move when positioned on top of the first moveable platform 810. The first moveable platform 810 may include a backplate 830. The backplate 830 may be coupled to an actuator 850 via a rod 840 or other mechanism. The actuator 850 may be configured to push and/or pull the first moveable platform 810 via coupling to the backplate 830.

For example, as depicted in a perspective view 900 of the first moveable platform 810 in FIG. 9, the first moveable platform 810 may move back and forth in directions 910. In some embodiments, the actuator 850 may control both the forward and reverse movement of the first moveable platform 810. In other embodiments, the actuator 850 may control one direction of movement and another mechanism, such as a spring, may cause movement in an opposite direction. The first moveable platform 810 may include one or more rubber bumpers 920 to absorb impact of the container as the container is shaken. In other embodiments, the actuator 850 may be configured to move the first moveable platform 810 in lateral directions, angled directions, or other non-linear directions. In some embodiments, the first moveable platform 810 may be moved vertically instead of back and forth to impart an increased amount of motion to contents of the container.

As depicted in FIG. 9 in close-up view 930, the first moveable platform 810 may be coupled to the actuator 850. The actuator 850 may be any suitable actuator, such as a pneumatic actuator or other type of actuator. The actuator 850 may drive the first moveable platform 810 via one or more rods 840. An air supply 940 may be coupled to the actuator 850 in some embodiments.

In FIG. 10, the first moveable platform 810 is depicted in a bottom perspective view 960. The first moveable platform 810 may be coupled to one or more linear support rails via one or more brackets. The linear support rails may be configured to allow the first moveable platform 810 to slide along the rails. For example, the frame of the automated container shaking system may include a first support 970 disposed at a first side of a first container slot, and a second support 980 disposed at a second side of the first container slot. The first moveable platform 810 may be coupled to the first support 970 via a first bracket 812, and to the second support 980 via a second bracket 814. The first moveable platform 810 may therefore not be in direct contact with either the first support 970 or the second support 980, but instead may be separated from the supports by the respective brackets 812, 814.

The first moveable platform 810 may slide along the first support 970 and the second support 980 when the actuator 850 is actuated. The sliding surfaces may be plastic-on-plastic. For example, the brackets may include a plastic underside, and the supports may include plastic coverings that allow for plastic on plastic sliding. In other embodiments, ball bearing assemblies or other sliding motion conducive equipment may be used. The first moveable platform 810 may be disposed on the first support 970 and the second support 980, and may be configured to slide on the first support and the second support. In some embodiments, the first support 970 and the second support 980 together may prevent the moveable platform 810 from lateral movement, so as to avoid contact with adjacent containers.

Any number of containers and/or supports may be included. For example, the system may include a third support disposed at a first side of a second container slot that is vertically aligned with the first container slot, and a fourth support disposed at a second side of the second container slot. The system may include a second moveable platform disposed on the third support and the fourth support, a second actuator coupled to the second moveable platform, the second actuator configured to push and pull the second moveable platform, and a second sensor configured to detect an item deposited into the second container. As depicted in close-up view 990 of the flared ends of the first moveable platform 810, the first moveable platform 810 may include the outwardly flared ends 820 to assist with loading of containers.

One or more operations of the methods, process flows, or use cases of FIGS. 1-10 may have been described above as being performed by a user device, or more specifically, by one or more program module(s), applications, or the like executing on a device. It should be appreciated, however, that any of the operations of the methods, process flows, or use cases of FIGS. 1-10 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-10 may be described in the context of the illustrative devices, it should be appreciated that such operations may be implemented in connection with numerous other device configurations.

The operations described and depicted in the illustrative methods, process flows, and use cases of FIGS. 1-10 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-10 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 11:
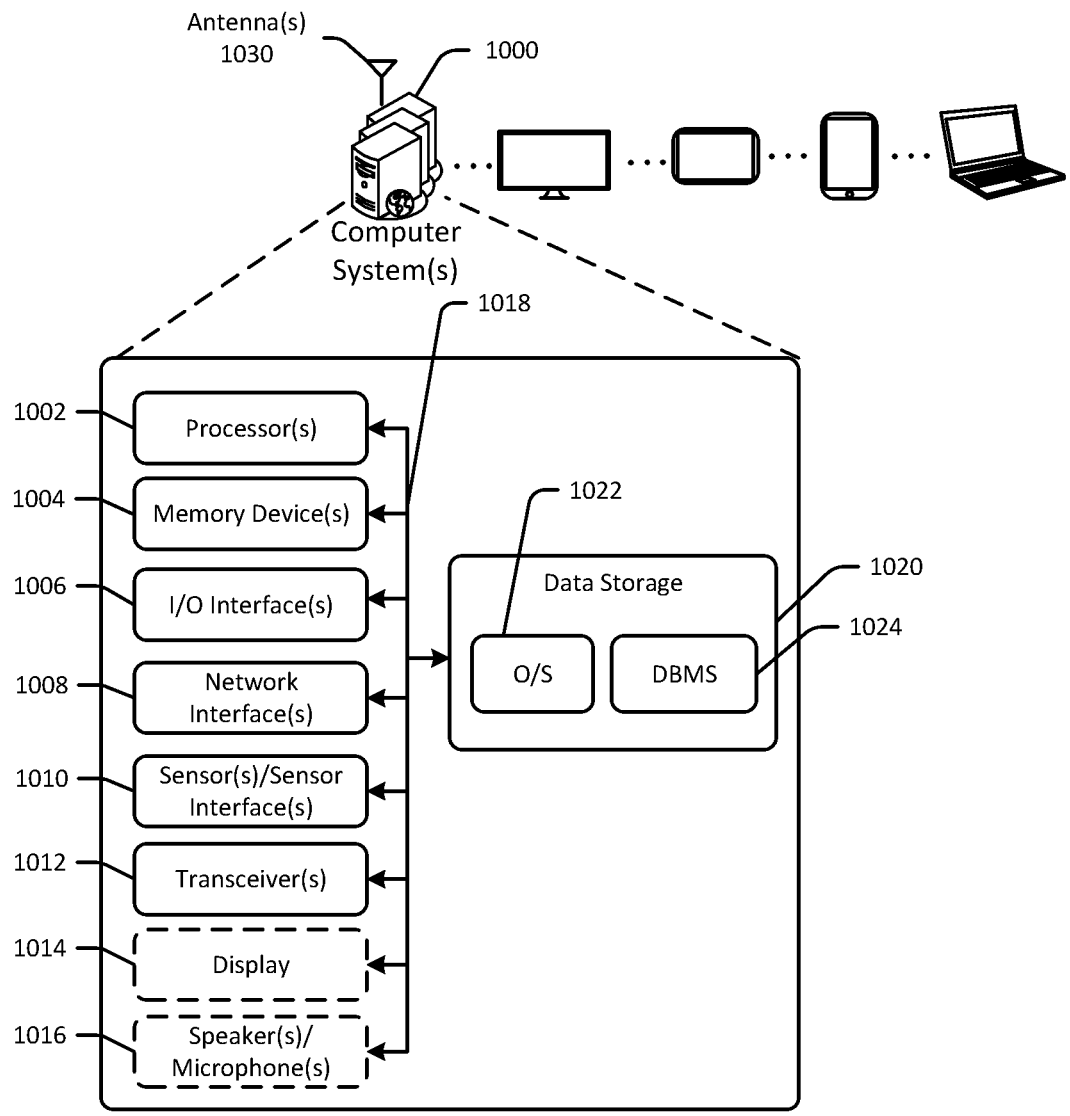
FIG. 11 schematically illustrates an example architecture of a computer system associated with an automated container shaking system in accordance with one or more embodiments of the disclosure.

FIG. 11 is a schematic block diagram of one or more illustrative computer system(s) 1000 in accordance with one or more example embodiments of the disclosure. The computer system(s) 1000 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 1000 may correspond to an illustrative device configuration for the controller(s) or computer system(s) of FIGS. 1-10.

The computer system(s) 1000 may be configured to communicate with one or more servers, user devices, or the like. The computer system(s) 1000 may be configured to control mobile carrier unit, item sorting machine, and/or automated container shaking systems.

The computer system(s) 1000 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 1000 may include one or more processors (processor(s)) 1002, one or more memory devices 1004 (also referred to herein as memory 1004), one or more input/output (I/O) interface(s) 1006, one or more network interface(s) 1008, one or more sensor(s) or sensor interface(s) 1010, one or more transceiver(s) 1012, one or more optional display(s) 1014, one or more optional microphone(s) 1016, and data storage 1020. The computer system(s) 1000 may further include one or more bus(es) 1018 that functionally couple various components of the computer system(s) 1000. The computer system(s) 1000 may further include one or more antenna(s) 1030 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1018 may include at least one of a system bus, a memory bus, an address bus, or a message bus, and may permit the exchange of information (e.g., data (including computer-executable code), signaling, etc.) between various components of the computer system(s) 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1004 of the computer system(s) 1000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to the memory 1004 for use by the processor(s) 1002 during the execution of the computer-executable instructions. Moreover, output data generated as a result of execution of the computer-executable instructions by the processor(s) 1002 may be stored initially in the memory 1004, and may ultimately be copied to the data storage 1020 for non-volatile storage.

More specifically, the data storage 1020 may store one or more operating systems (O/S) 1022; one or more database management systems (DBMS) 1024; and one or more program module(s), applications, engines, computer-executable code, scripts, or the like. Some or all of these module(s) may be sub-module(s). Any of the components depicted as being stored in the data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in the data storage 1020 may support functionality described in reference to corresponding components named earlier in this disclosure.

The data storage 1020 may further store various types of data utilized by the components of the computer system(s) 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 1002 may be configured to access the memory 1004 and execute the computer-executable instructions loaded therein. For example, the processor(s) 1002 may be configured to execute the computer-executable instructions of the various program module(s), applications, engines, or the like of the computer system(s) 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to other illustrative components depicted as being stored in the data storage 1020, the O/S 1022 may be loaded from the data storage 1020 into the memory 1004 and may provide an interface between other application software executing on the computer system(s) 1000 and the hardware resources of the computer system(s) 1000. More specifically, the O/S 1022 may include a set of computer-executable instructions for managing the hardware resources of the computer system(s) 1000 and for providing common services to other application programs (e.g., managing memory allocation among various application programs). In certain example embodiments, the O/S 1022 may control execution of the other program module(s). The O/S 1022 may include any operating system now known or which may be developed in the future including, but not limited to, any server operating system, any mainframe operating system, or any other proprietary or non-proprietary operating system.

The DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 1000 is a mobile device, the DBMS 1024 may be any suitable lightweight DBMS optimized for performance on a mobile device.

Referring now to other illustrative components of the computer system(s) 1000, the input/output (I/O) interface(s) 1006 may facilitate the receipt of input information by the computer system(s) 1000 from one or more I/O devices as well as the output of information from the computer system(s) 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna(s) 1030 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 1000 may further include one or more network interface(s) 1008 via which the computer system(s) 1000 may communicate with any of a variety of other systems, platforms, networks, devices, and so forth. The network interface(s) 1008 may enable communication, for example, with one or more wireless routers, one or more host servers, one or more web servers, and the like via one or more networks.

The antenna(s) 1030 may include any suitable type of antenna depending, for example, on the communications protocols used to transmit or receive signals via the antenna(s) 1030. Non-limiting examples of suitable antennas may include directional antennas, non-directional antennas, dipole antennas, folded dipole antennas, patch antennas, multiple-input multiple-output (MIMO) antennas, or the like. The antenna(s) 1030 may be communicatively coupled to one or more transceivers 1012 or radio components to which or from which signals may be transmitted or received.

As previously described, the antenna(s) 1030 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 1030 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 1030 may be configured to transmit or receive radio frequency signals within any suitable frequency range forming part of the unlicensed portion of the radio spectrum.

The antenna(s) 1030 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(s) 1030—transmitting or receiving radio frequency (RF) signals in the bandwidth and/or channels corresponding to the communications protocols utilized by the computer system(s) 1000 to communicate with other devices. The transceiver(s) 1012 may include hardware, software, and/or firmware for modulating, transmitting, or receiving—potentially in cooperation with any of antenna(s) 1030—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the computer system(s) 1000. The transceiver(s) 1012 may further include a low noise amplifier (LNA), additional signal amplifiers, an analog-to-digital (A/D) converter, one or more buffers, a digital baseband, or the like.

The sensor(s)/sensor interface(s) 1010 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 1014 may be configured to output light and/or render content. The optional speaker(s)/microphone(s) 1016 may be any device configured to receive analog sound input or voice data.

It should be appreciated that the program module(s), applications, computer-executable instructions, code, or the like depicted in FIG. 11 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 1000, and/or hosted on other computing device(s) accessible via one or more networks, may be provided to support functionality provided by the program module(s), applications, or computer-executable code depicted in FIG. 11 and/or additional or alternate functionality. Further, functionality may be modularized differently such that processing described as being supported collectively by the collection of program module(s) depicted in FIG. 11 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 11 may be implemented, at least partially, in hardware and/or firmware across any number of devices.

It should further be appreciated that the computer system(s) 1000 may include alternate and/or additional hardware, software, or firmware components beyond those described or depicted without departing from the scope of the disclosure. More particularly, it should be appreciated that software, firmware, or hardware components depicted as forming part of the computer system(s) 1000 are merely illustrative and that some components may not be present or additional components may be provided in various embodiments. While various illustrative program module(s) have been depicted and described as software module(s) stored in the data storage 1020, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A container shaking system for use with an item sortation machine, the container shaking system comprising:
   a frame that forms a container slot array, the frame comprising a first container slot in a first row and a second container slot in a second row, wherein individual container slots are configured to support individual containers;
   a first container disposed in the first container slot, the first container configured to receive items from the item sortation machine;
   a first support disposed at a first side of the first container slot, wherein the first support is not in direct contact with the first container;
   a second support disposed at a second side of the first container slot, wherein the second support is not in direct contact with the first container;
   a first reciprocating tray disposed on the first support and the second support, the first reciprocating tray configured to slide on the first support and the second support, the first reciprocating tray comprising a first flared end at a first side and a second flared end at a second side, wherein the first container is disposed on the first reciprocating tray;
   a first electric motor coupled to the first reciprocating tray, the first electric motor configured to push the first reciprocating tray from a first position to a second position, and to pull the first reciprocating tray from the second position to the first position; and
   a first sensor configured to detect an item deposited into the first container;
   wherein the first sensor triggers the first electric motor to push and pull the first reciprocating tray a predetermined number of times.

2. The container shaking system of claim 1, further comprising:
   a controller configured to:
      determine, using the first sensor, that the item has been deposited into the first container;
      cause actuation of the first reciprocating tray; and
      optionally determine, using a camera, that items in the first container are substantially evenly distributed in the first container.

3. The container shaking system of claim 1, further comprising:
   a first chute coupled to the frame and disposed adjacent to both the first container and the first sensor, wherein items from the item sortation machine pass through the first chute and fall into the first container;
   wherein the first chute is coupled to the frame with a first pin at a proximal end adjacent to the item sortation machine, and a second pin at a distal end adjacent to the first container, and wherein the first pin is a breakaway pin configured to break at a force of less than 140 Newtons.

4. The container shaking system of claim 1, further comprising:
   a second container disposed in the second container slot;
   a third support disposed at a first side of the second container slot;
   a fourth support disposed at a second side of the second container slot;
   a second reciprocating tray disposed on the third support and the fourth support, the second reciprocating tray configured to slide on the third support and the fourth support, wherein the second container is disposed on the second reciprocating tray;
   a second electric motor coupled to the second reciprocating tray; and
   a second sensor configured to detect an item deposited into the second container;
   wherein the second sensor triggers the second electric motor to push and pull the second reciprocating tray a predetermined number of times.

5. A container shaking system comprising:
   a first support disposed at a first side of a first container slot;
   a second support disposed at a second side of the first container slot;
   a first moveable platform disposed on the first support and the second support, wherein the first moveable platform is configured to slide on the first support and the second support, and wherein the first moveable platform is configured to receive a first container;
   a first actuator coupled to the first moveable platform, the first actuator configured to push and pull the first moveable platform; and
   a controller configured to:
      detect, using a first sensor, an item; and
      cause actuation of the first moveable platform via the first actuator.

6. The container shaking system of claim 5, wherein triggering of the first actuator causes the first actuator to push and pull the first moveable platform a plurality of times.

7. The container shaking system of claim 6, wherein a delay between a pull event and a subsequent push event is modifiable based at least in part on dimensions of items in the first container, and wherein a push force or a pull force generated by the first actuator is modifiable based at least in part on the dimensions of items in the first container.

8. The container shaking system of claim 5, wherein a delay between a pull event and a subsequent push event is modifiable based at least in part on a fullness level of the first container, and wherein a push force or a pull force generated by the first actuator is modifiable based at least in part on the fullness level of the first container.

9. The container shaking system of claim 5, further comprising:
a first camera configured to image the first container; and
a controller configured to:
determine, using image data from the first camera, that items in the first container are not substantially evenly distributed; and
cause the first actuator to be triggered.

10. The container shaking system of claim 5, further comprising:
a frame;
a first chute disposed adjacent to both the first container and the first sensor, wherein items from an item sortation machine pass through the first chute and fall into the first container;
wherein the first chute is coupled to the frame with a first pin at a proximal end adjacent to the item sortation machine, and a second pin at a distal end adjacent to the first container, and wherein the first pin is a breakaway pin.

11. The container shaking system of claim 5, further comprising:
a frame;
a first chute disposed adjacent to both the first container and the first sensor, wherein items from an item sortation machine pass through the first chute and fall into the first container;
wherein the first chute is coupled to the frame with a spring at a proximal end adjacent to the item sortation machine, and wherein the spring has a spring constant of between 50 Newtons/meter and 75 Newtons/meter.

12. The container shaking system of claim 5, further comprising:
a third support disposed at a first side of a second container slot that is vertically aligned with the first container slot;
a fourth support disposed at a second side of the second container slot;
a second moveable platform disposed on the third support and the fourth support;
a second actuator coupled to the second moveable platform, the second actuator configured to push and pull the second moveable platform; and
a second sensor configured to detect an item deposited into the second container.

13. The container shaking system of claim 5, wherein the first support and the second support together prevent the moveable platform from lateral movement.

14. The container shaking system of claim 5, wherein the moveable platform comprises a first flared end at a first side, and a second flared end at a second side, and wherein the first flared end and the second flared end guide the first container onto the first moveable platform.

15. The container shaking system of claim 5, wherein the first support is not in direct contact with the first container, and the second support is not in direct contact with the first container.

16. A container shaking system comprising:
a first support disposed at a first side of a first container slot;
a second support disposed at a second side of the first container slot;
a first moveable platform disposed on the first support and the second support, wherein the first moveable platform is configured to slide on the first support and the second support, and wherein the first moveable platform is configured to receive a first container;
a first actuator coupled to the first moveable platform, the first actuator configured to push and pull the first moveable platform; and
a controller configured to:
detect an item; and
cause actuation of the first moveable platform via the first actuator.

17. The container shaking system of claim 16, wherein triggering of the first actuator causes the first actuator to push and pull the first moveable platform a plurality of times.

18. The container shaking system of claim 17, wherein a delay between a pull event and a subsequent push event is modifiable based at least in part on dimensions of items in the first container, and wherein a push force or a pull force generated by the first actuator is modifiable based at least in part on the dimensions of items in the first container.

19. The container shaking system of claim 16, wherein the moveable platform comprises a first flared end at a first side, and a second flared end at a second side, and wherein the first flared end and the second flared end guide the first container onto the first moveable platform.

20. The container shaking system of claim 16, wherein the first support and the second support together prevent the first moveable platform from lateral movement.

* * * * *

UNITED STATES PATENT AND TRADEMARK OFFICE
CERTIFICATE OF CORRECTION

PATENT NO. : 11,396,432 B1
APPLICATION NO. : 17/112038
DATED : July 26, 2022
INVENTOR(S) : Navarria et al.

It is certified that error appears in the above-identified patent and that said Letters Patent is hereby corrected as shown below:

On the Title Page

Please add the following Inventors in (72):
Nima Tohib        Seattle      WA   (US)
Ian Ronald Hay    San Diego   CA   (US)

Signed and Sealed this
Third Day of October, 2023

*Katherine Kelly Vidal*
Katherine Kelly Vidal
*Director of the United States Patent and Trademark Office*